(No Model.)
C. F. PIKE.
WATER CLOSET.
No. 270,980. Patented Jan. 23, 1883.
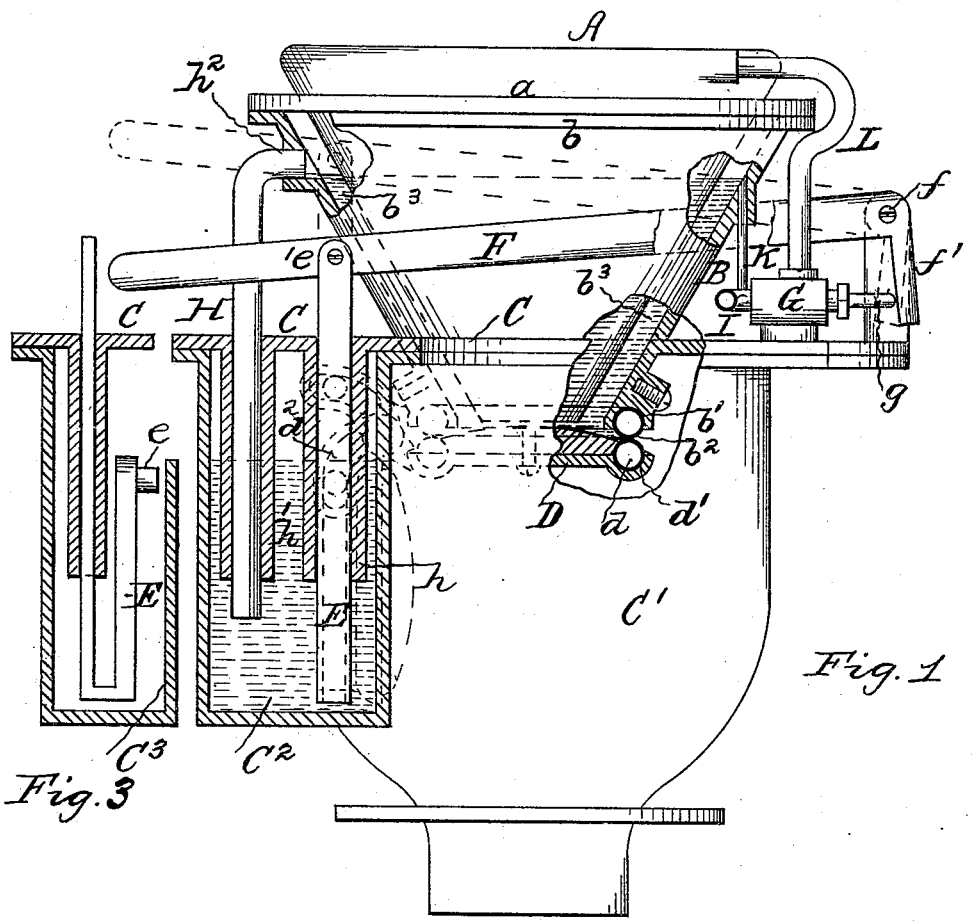
Fig. 1
Fig. 3
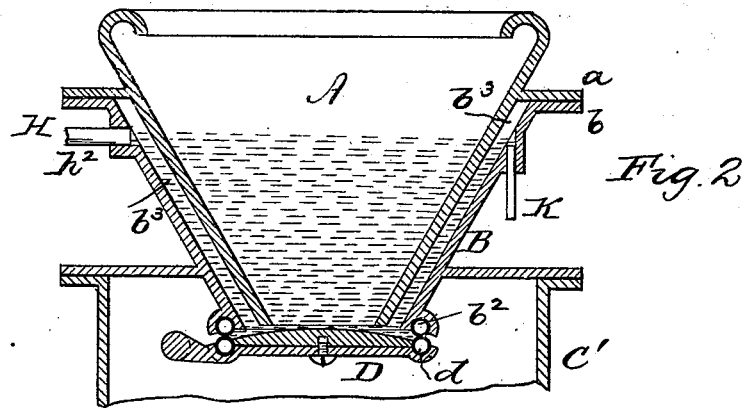
Fig. 2
Witnesses:
Inventor
Charles F. Pike
By S. J. Van Stavoren
Attorney.

UNITED STATES PATENT OFFICE.

CHARLES F. PIKE, OF PHILADELPHIA, PENNSYLVANIA, ASSIGNOR TO THE NATIONAL ANTI-SEWER GAS COMPANY, OF CAMDEN, NEW JERSEY.

WATER-CLOSET.

SPECIFICATION forming part of Letters Patent No. 270,980, dated January 23, 1883.

Application filed August 7, 1882. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Water-Closets, of which the following is a specification, reference being had therein to the accompanying drawings, wherein—

Figure 1 is an elevation, partly sectional, of a water-closet embodying my improvements. Fig. 2 is a detail section of the same, and Fig. 3 is a detail section.

My invention has relation to water-closets, having especial reference to that class of such devices wherein a clapper or valve is employed to retain the water in the bowl and effect a seal therefor, and has for its object to provide a running-water seal for said bowl and a like seal for the retainer.

My invention accordingly consists of a container having a lid provided with a receptacle corresponding in shape or outline to that of the bowl, and in which the latter rests and has its support thereon in such a manner that a space is provided between said receptacle and bowl. The lower edge of said receptacle forms a seat for the clapper or valve. Into said receptacle leads a branch pipe from the water-supply pipe, and it is provided with an overflow-pipe leading into the container, whereby a supply of water is constantly passing into and out of said receptacle and bowl to form a running seal therefor. Said overflow-pipe enters a chamber or pocket in the container, in which is also located the intermediate mechanism between the clapper and the operating-lever of the closet. The water from said overflow-pipe rises in said chamber and seals the openings in the container-lid to form a running-water seal therefor.

My invention still further consists in the novel combination, construction, and arrangement of parts hereinafter specifically described and claimed.

Referring to the accompanying drawings, A represents the closet-bowl, having a flange, $a$, resting on a flange, $b$, of a receptacle, B, formed on the container-lid C. Said receptacle corresponds in outline to that of the bowl, and is of such dimensions that when the bowl is inserted therein a space, $b^3$, is provided between said parts. The lower end of said receptacle is grooved at $b'$, into which is inserted a hollow rubber ring or other suitable packing, $b^2$.

D represents the clapper or valve, of any suitable form, having a hollow rubber ring, $d$, at its periphery in the groove $d'$, as shown, and is journaled to the container C′ in any suitable manner. It is also provided with a slotted arm or crank $d^2$, which receives the pin $e$ on link E. The latter is pivoted at $e'$ to lever F, journaled at $f$ to lid C, and is provided with an arm, $f'$, for operating the push-rod $g$ of cock G. The link E passes through a tube, $h$, depending from lid C, and $h'$ is another like tube, through which passes an overflow-pipe, H, secured at $h^2$ to receptacle B. Said tubes, pipe, and link are located in a chamber, C², of the container C′, having a wall, C³, which does not extend up to the lid C, as plainly shown in Fig. 3.

I represents the water-supply pipe for cock G. K is a branch leading therefrom to receptacle B, and L is the flushing-pipe for the bowl.

The operation is as follows: Water from pipe I continuously passes through tube K into space $b^3$, between receptacle B and bowl A. such water rises in said space and in the bowl, as shown in Fig. 2, until it reaches the overflow-pipe H, through which it passes to chamber C², rising therein until it overflows the top edge of wall C³, whence it flows through the container C′ to the trap and soil-pipe, forming a running-water seal for said parts. The bowl is thereby sealed, as are also the depending tubes $h$ $h'$, so that any sewer-gas or fecal-matter odors escaping into or arising in container C′ cannot pass out thereof, but are held therein until absorbed by the constant flow of fresh water passing into the container from chamber C². The tubes $b^2$ $d$ being hollow are exceedingly flexible; hence any irregularities in their construction are automatically taken up by said tubes when they are brought into contact with each other, thereby forming a tight joint therebetween to prevent leakage of water or escape of sewer-gas or fecal-matter odors therethrough. As the lever F is lifted after the closet is used the link E slides up the tube $h$, operates the slotted arm or crank $d^2$ to lower the clapper D, whereupon the water in space $b^3$ and bowl A, together with deposits of fecal-matter, fall into the container C'. The arm $f''$, meanwhile striking push-rod $g$ of cock G, opens the same and flushes the bowl. The clapper being returned to its normal position the water rises in bowl A and space $b^3$, as above described. If desired, the gum ring or tube $b^2$ may be dispensed with, and in lieu thereof the lower edge of the receptacle B may be so formed that the ring $d$ will seat itself thereagainst to form a tight joint therewith. Again, if desired, rings of solid rubber or other suitable packing may be substituted for the hollow rings $d\ b^2$.

What I claim as my invention is—

1. In a water-closet, the combination of a bowl, a receptacle, B, having an elastic tubular ring, $b^2$, a clapper or pan having an elastic tubular ring, $d$, and mechanism for operating said clapper, substantially as shown and described.

2. The container C', having lid C, combined with receptacle B, valve D, overflow H, and branch or water-supply pipe K, substantially as shown and described.

3. The combination of bowl A, receptacle B, pan or clapper D, a water-supply pipe, a branch between said pipe and receptacle, and an overflow-pipe for the latter, substantially as shown and described, whereby a running-water seal is provided for said bowl and receptacle, as set forth.

4. The container C', having chamber $C^2$, the lid C, having depending tubes $h\ h'$, receptacle B, and valve D, in combination with an overflow-pipe, H, and water-supply pipe K, substantially as shown and described.

5. The combination of bowl A, clapper D, lid C, having receptacle B, with water-supply and overflow pipes K and H, respectively, and depending tubes $h\ h'$, the container C', having chamber $C^2$, the lever F, and operating mechanism between said lever and clapper, substantially as shown and described.

6. The combination of receptacle B, valve D, the water-pipe I, cock G, and branch pipe K, and overflow-tube H, substantially as shown and described.

In testimony whereof I affix my signature in presence of two witnesses.

CHARLES F. PIKE.

Witnesses:
S. J. VAN STAVOREN,
CHAS. F. VAN HORN.